United States Patent
Xu

(10) Patent No.: US 12,390,925 B2
(45) Date of Patent: Aug. 19, 2025

(54) ANTI-DISTURBANCE METHOD AND DEVICE FOR ROBOT, AND ROBOT

(71) Applicant: Beijing Xiaomi Robot Technology Co., Ltd., Beijing (CN)

(72) Inventor: Zhe Xu, Beijing (CN)

(73) Assignee: Beijing Xiaomi Robot Technology Co., Ltd., Beijing (CN)

( * ) Notice: Subject to any disclaimer, the term of this patent is extended or adjusted under 35 U.S.C. 154(b) by 334 days.

(21) Appl. No.: 18/104,211

(22) Filed: Jan. 31, 2023

(65) Prior Publication Data

US 2024/0139942 A1 May 2, 2024

(30) Foreign Application Priority Data

Oct. 31, 2022 (CN) .......................... 202211352057.9

(51) Int. Cl.
*B25J 9/16* (2006.01)
*B25J 13/08* (2006.01)

(52) U.S. Cl.
CPC ........... *B25J 9/1653* (2013.01); *B25J 13/089* (2013.01)

(58) Field of Classification Search
CPC ... B60L 2260/34; B25J 13/089; B25J 9/1653; B62D 57/024; B62D 57/032; G05D 1/0891
See application file for complete search history.

(56) References Cited

U.S. PATENT DOCUMENTS

| | | | | |
|---|---|---|---|---|
| 7,657,345 B2 * | 2/2010 | Endo | ........................ | B25J 9/161 |
| | | | | 318/568.17 |
| 8,195,332 B2 * | 6/2012 | Pratt | ..................... | B62D 57/032 |
| | | | | 700/258 |
| 8,849,454 B2 * | 9/2014 | Yun | ....................... | B62D 57/032 |
| | | | | 901/1 |
| 9,895,804 B1 * | 2/2018 | Perkins | .................... | B25J 9/144 |
| 2021/0147016 A1 | 5/2021 | Stephens | | |

OTHER PUBLICATIONS

European Patent Application No. 23154133.5, Search and Opinion dated Aug. 16, 2023, 12 pages.
Chinese Patent Application No. 202211352057.9, Office Action dated Oct. 14, 2023, 6 pages.
Chinese Patent Application No. 202211352057.9, English translation of Office Action dated Oct. 14, 2023, 8 pages.
Liu, D. et al. "Research on RCG Attitude Control Algorithm of Biped Robot" Acta Electronica Sinica, vol. 46, No. 8, Aug. 2018, pp. 1842-1848.

* cited by examiner

*Primary Examiner* — Adam R Mott
*Assistant Examiner* — James Miller Watts, III
(74) *Attorney, Agent, or Firm* — Cozen O'Connor

(57) ABSTRACT

An anti-disturbance method for a robot includes: acquiring current speed information of the robot in a moving coordinate system; determining a disturbance state of the robot based on the current speed information and a desired speed of the robot, in which the disturbance state includes a disturbed state and a normal state; and adjusting a gait frequency of the robot, in response to determining that the disturbance state is the disturbed state.

17 Claims, 4 Drawing Sheets

Disturbance from external force

US 12,390,925 B2

ANTI-DISTURBANCE METHOD AND DEVICE FOR ROBOT, AND ROBOT

CROSS-REFERENCE TO RELATED APPLICATION

This application claims priority to and benefits of Chinese Patent Application No. 202211352057.9, filed on Oct. 31, 2022, the entire content of which is incorporated herein by reference.

BACKGROUND

In recent years, with the continuous progress of society and the development of science and technology, robots are widely used in modern industry, and the requirements of people for functions of various aspects of the robot are also increasing constantly. In order to satisfy the requirements of society, in both industry and academia, the research of an intelligent robot is a hot spot, in which a mobile robot is an important field of the research in recent years.

SUMMARY

The present disclosure relates to a field of robots, in particular to an anti-disturbance method and device for a robot, and a robot.

In a first aspect, an embodiment of the present disclosure provides an anti-disturbance method for a robot, and the anti-disturbance method includes: acquiring current speed information of the robot in a moving coordinate system; determining a disturbance state of the robot based on the current speed information and a desired speed of the robot, in which the disturbance state includes a disturbed state and a normal state; and adjusting a gait frequency of the robot, if the disturbance state is the disturbed state.

In a second aspect, an embodiment of the present disclosure provides an anti-disturbance device for a robot, and the anti-disturbance device includes: an acquiring unit configured to acquire current speed information of the robot in a moving coordinate system; a determination unit configured to determine a disturbance state of the robot based on the current speed information and a desired speed of the robot, in which the disturbance state includes a disturbed state and a normal state; and an adjusting unit configured to adjust a gait frequency of the robot, if the disturbance state is the disturbed state.

In a third aspect, an embodiment of the present disclosure provides a robot, which includes an anti-disturbance device. The anti-disturbance device includes: an acquiring unit configured to acquire current speed information of the robot in a moving coordinate system; a determination unit configured to determine a disturbance state of the robot based on the current speed information and a desired speed of the robot, wherein the disturbance state comprises a disturbed state and a normal state; and an adjusting unit configured to adjust a gait frequency of the robot, in response to determining that the disturbance state is the disturbed state.

DETAILED DESCRIPTION

In order to make the object, technical solution and advantages of the present disclosure clearer, the present disclosure will be further described in detail with reference to the accompanying drawings. Apparently, the described embodiments are only some of the embodiments of the present disclosure, but not all of them. Based on the embodiments of the present disclosure, all the other embodiments obtained by those skilled in the art without creative efforts fall into the scope of protection of the present disclosure.

Some terms used herein are explained below.

The term "and/or" in the embodiments of the present disclosure describes an association relationship of associated objects, indicating that there may be three relationships. For example, A and/or B may indicate that A exists alone, A and B exist simultaneously, and B exists alone. The character "/" generally indicates that the former and latter associated objects have an "or" relationship.

In recent years, with the continuous progress of society and the development of science and technology, robots are widely used in modern industry, and the requirements of people for functions of various aspects of the robot are also increasing constantly. In order to satisfy the requirements of society, in both industry and academia, the research of an intelligent robot is a hot spot, in which a mobile robot is an important field of the research in recent years.

At present, most of the mobile robots are quadruped robots, and the quadruped robot has a low energy consumption and a low noise when stepping at a low frequency, so when walking at a low speed, the robot walks at a low frequency. However, the existing technical solutions cannot support the robot to automatically change a gait frequency. When the robot is disturbed, it needs to change a landing point to keep the balance. Since a leg length and a torque limit a low-frequency gait, a great change of the landing point cannot be achieved, the robot can only resist the disturbance by adjusting the landing point and a trunk posture, which cannot meet the requirement of anti-disturbance. Therefore, there is a need for a method to detect whether the robot is disturbed, which can meet the requirements of anti-disturbance, and automatically switch to a high-frequency gait to maintain balance after disturbance.

Figure 1:
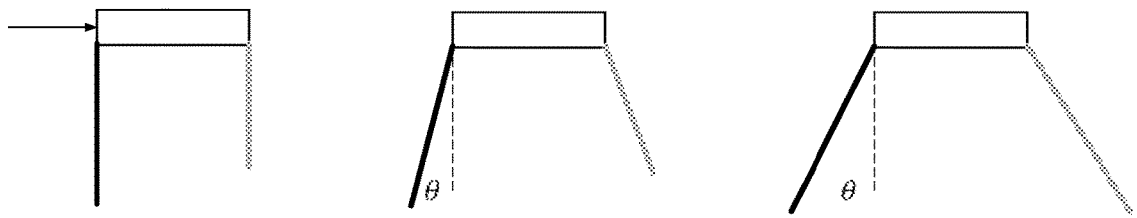
FIG. 1 is a schematic view of support of a robot according to an embodiment of the present disclosure.

First, it needs to explain why the low-frequency gait cannot cope with a large disturbance. As shown in FIG. 1, a black line in the drawing is a support leg, and a gray line is a swinging leg. When the robot is disturbed in a walking state, it needs to adjust the landing point to ensure its own stability, that is, to stride in the direction of disturbance. The lower the walking frequency, the longer the supporting time sustained by the support leg, so that when the same disturbance is applied, the stride amplitude of the low-frequency gait to maintain its own stability is larger, and correspondingly, the angle θ in the drawing the is larger. In this case, the support leg will exceed its maximum length, and the torque of the support leg will be too large, thus causing the robot to lose its balance. Therefore, the low-frequency gait has less stability than a high-frequency gait.

The technical solution provides an anti-disturbance method for a robot, which meets the requirements of anti-disturbance, and can automatically switch to a high-frequency gait to maintain balance after disturbance. The anti-disturbance method, device, apparatus and medium for the robot provided by the present disclosure will be explained below in more detail with reference to the drawings and embodiments.

Figure 2:
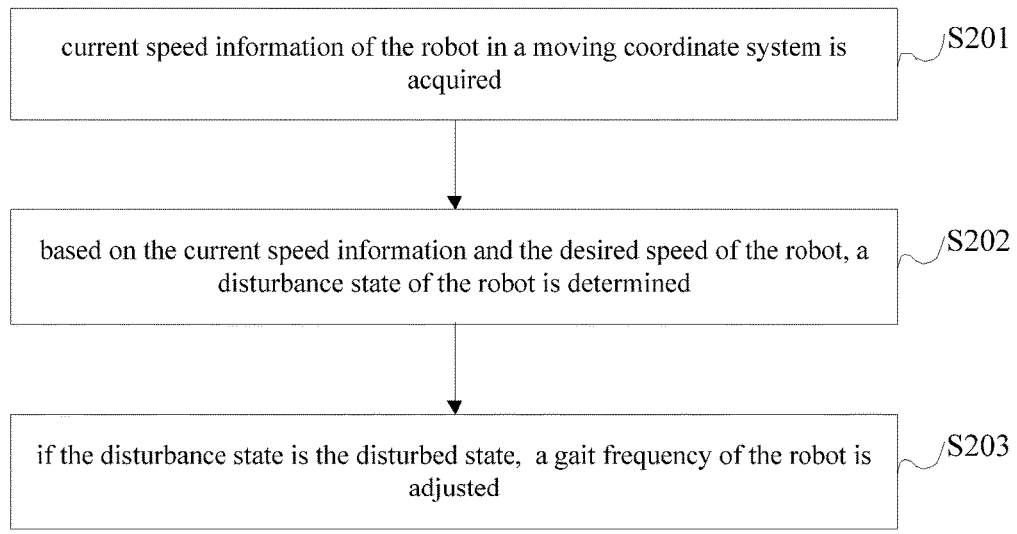
FIG. 2 is a flow chart of an anti-disturbance method for a robot according to an embodiment of the present disclosure.

The embodiments of the present disclosure provide an anti-disturbance method for a robot, as shown in FIG. 2, which includes the following steps.

At step S201, current speed information of the robot in a moving coordinate system is acquired.

In some embodiments, the current speed information of the robot is acquired by a sensor or other devices, and the current speed information of the robot in the moving coordinate system refers to current speed information of the robot in operation, including a first current speed of the robot in a first direction of the moving coordinate system and a second current speed of the robot in a second direction of the moving coordinate system. A desired speed includes a first desired speed of the robot in the first direction of the moving coordinate system and a second desired speed of the robot in the second direction of the moving coordinate system, and the current speed information of the robot may also include a first average speed of the robot in the first direction of the moving coordinate system and a second average speed of the robot in the second direction of the moving coordinate system, in which the speed of the robot is not zero.

When the speed of the robot is zero, i.e. the robot is at rest, it will also be disturbed, so the current speed information also includes position information in this case.

It should be noted that the robot mentioned in this solution may be a multi-legged robot or a roller robot. The embodiments of the present disclosure are not limited to this, and the following description will take a quadruped robot as an example.

At step S202, based on the current speed information and the desired speed of the robot, a disturbance state of the robot is determined.

In some embodiments, the disturbance state includes a disturbed state and a normal state, and a first difference value between the first current speed and the first desired speed and a second difference value between the second current speed and the second desired speed are determined. If the first difference value or the second difference value is greater than a first preset speed threshold, it is determined that the disturbance state of the robot is the disturbed state. If the first difference value is not greater than the first preset speed threshold and the second difference value is not greater than the first preset speed threshold, it is determined that the disturbance state of the robot is the normal state. In this solution, there is a certain steady-state error between the speed of the robot and the desired speed. For example, the desired speed is 1 m/s, but the final stable speed of the robot may be 0.9 m/s. In this case, only considering the difference value between the speed and the desired speed will trigger a false disturbance. Therefore, it is also necessary to consider a difference between the speed and an average speed, that is, the average speed represents an average of a feedback speed of the robot in a last stepping time.

Therefore, when referring to the average speed, a third difference value between the first current speed and the first average speed is determined, and a fourth difference value between the second current speed and the second average speed is determined. If the first difference value or the second difference value is greater than the first preset speed threshold, and the third difference value or the fourth difference value is greater than a second preset speed threshold, it is determined that the disturbance state of the robot is the disturbed state.

Furthermore, if the speed of the robot is zero at step S201, the disturbance state of the robot is determined based on position information and desired position information of the robot, that is, it is determined whether there is disturbance according to a position difference.

At step S203, if the disturbance state is the disturbed state, a gait frequency of the robot is adjusted.

In some embodiments, if the disturbance state is the disturbed state, a target gait frequency is determined based on the first difference value and the second different value, and the gait frequency of the robot is adjusted to be the target gait frequency.

After a certain period of the adjustment, if the first difference value and the second difference value are both smaller than a third preset speed threshold, it is determined that the disturbance state of the robot is the normal state, that is, the disturbance has been cancelled, the gait frequency of the robot will be restored from the target gait frequency to the gait frequency before adjustment.

Figure 3:
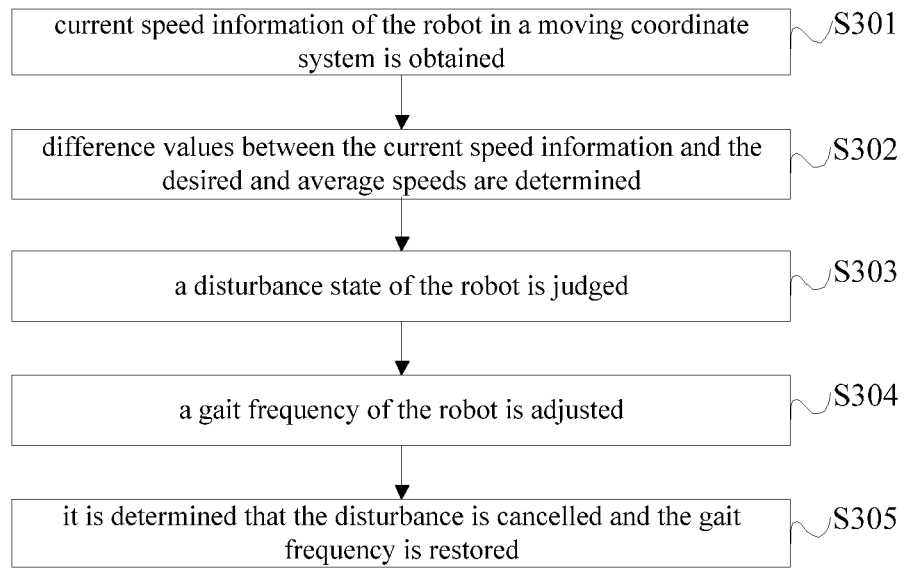
FIG. 3 is a specific flow chart of an anti-disturbance method for a robot according to an embodiment of the present disclosure.

As shown in FIG. 3, the anti-disturbance method for the robot provided by the embodiments of the present disclosure may include the following specific steps.

At step S301, current speed information of the robot in a moving coordinate system is obtained.

In some embodiments, the current speed information of the robot is obtained by a sensor or other devices. The current speed information of the robot in the moving coordinate system includes a first current speed of the robot in a first direction of the moving coordinate system and a second current speed of the robot in a second direction of the moving coordinate system. A desired speed includes a first desired speed of the robot in the first direction of the moving coordinate system and a second desired speed of the robot in the second direction of the moving coordinate system. The current speed information of the robot may also include a first average speed of the robot in the first direction of the moving coordinate system and a second average speed of the robot in the second direction of the moving coordinate system, in which the speed of the robot is not zero.

When the speed of the robot is zero, that is, the robot is at rest, it will also be disturbed, so the current speed information also includes position information in this case.

Figure 4:
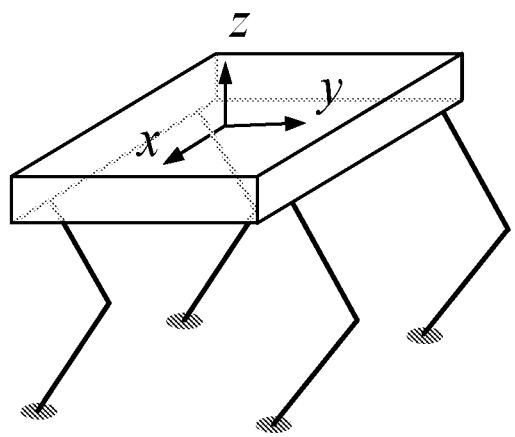
FIG. 4 is a schematic diagram of an anti-disturbance coordinate system for a robot according to an embodiment of the present disclosure.

In an example, as shown in FIG. 4, the coordinate system of the robot includes an x axis, a y axis and a z axis. When it is judged whether the disturbance occurs or disappears, since the robot is generally disturbed by a linear speed during use, the judgment of the disturbance only involves the x and y directions. The first direction is the x direction, and the second direction is the y direction.

At step S302, difference values between the current speed information and the desired and average speeds are determined.

In some embodiments, a first difference value between the first current speed and the first desired speed is determined, a second difference value between the second current speed and the second desired speed is determined, a third difference value between the first current speed and the first average speed is determined, and a fourth difference value between the second current speed and the second average speed is determined.

At step S303, a disturbance state of the robot is judged.

In some embodiments, if the first difference value or the second difference value is greater than a first preset speed threshold, and the third difference value or the fourth difference value is greater than a second preset speed threshold, it is determined that the disturbance state of the robot is the disturbed state, and step S304 is performed. On the contrary, if the first difference value is not greater than the first preset speed threshold and the second difference value is not greater than the first preset speed threshold, it is determined that the disturbance state of the robot is the normal state, and the method returns to step S301.

Furthermore, if the acquired speed of the robot is zero at step S301, the disturbance state of the robot is determined based on position information and desired position information of the robot, that is, it is judged whether there is disturbance by a position difference.

Still following the above example, if the robot is in a stepping state, the conditions for judging the disturbance include the difference between the x-direction speed and the x-direction desired speed, the difference between the y-direction speed and the y-direction desired speed, the difference between the x-direction speed and the x-direction average speed, and the difference between the y-direction speed and the y-direction average speed. Only when the difference values between the current speed and the desired and average speeds are relatively large at the same time, the robot is considered to be subjected to an external disturbance.

In this step, active configurations may also be added, so that the current gait is not allowed to automatically switch, so as to deal with some special occasions.

At step S304, a gait frequency of the robot is adjusted.

In some embodiments, if the disturbance state is the disturbed state, a target gait frequency is determined based on the first difference value and the second difference value, and then the gait frequency of the robot is adjusted to be the target gait frequency. Generally speaking, the gait frequency of the robot is increased to reduce the limitation of the leg length and the torque.

Still following the above example, it is necessary to switch the gait frequency immediately to ensure the stability of the robot after judging that the robot is disturbed. For the low-frequency gait, since a swinging time of the leg is long, the required landing point is far from a position of a body of the robot after the same disturbance is applied, which tends to cause the swinging leg to exceed the working space. Therefore, the disturbance can be better resisted by adjusting the gait frequency while adjusting the landing point.

Figure 5:
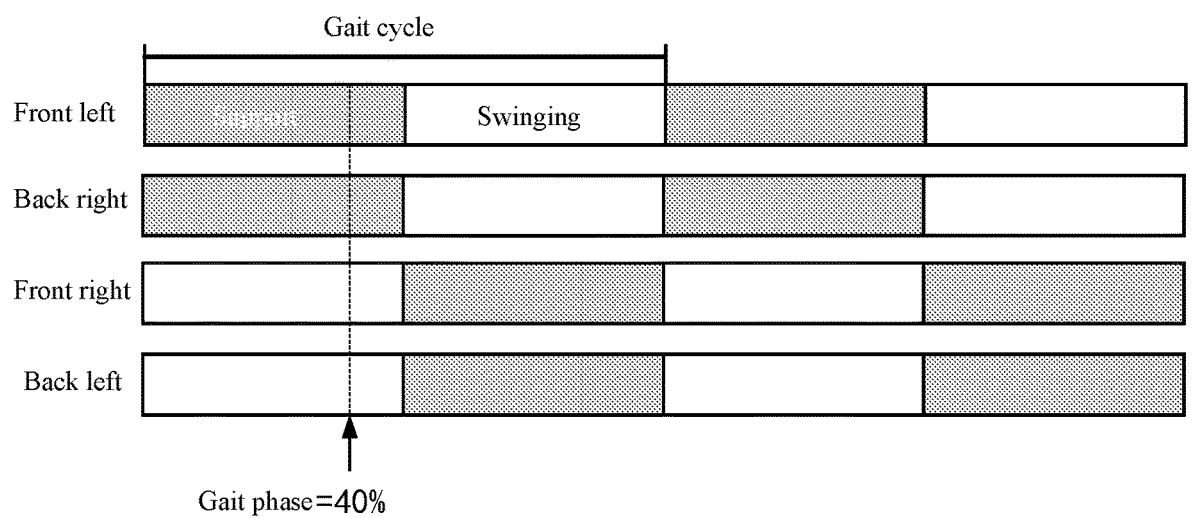
FIG. 5 is a schematic diagram of a gait according to an embodiment of the present disclosure.

Generally, adjusting the gait frequency happens in a support period, but for anti-disturbance, it is necessary to change the gait frequency immediately, otherwise the robot may lose stability in this step. In order to ensure the continuous switching of two different gait frequencies, it is necessary to ensure that the phases of the two gaits are as close as possible. The gait phase refers to the percentage of a complete gait cycle. As shown in FIG. 5, gray represents a support phase, and white represents a swinging phase. The gait phase represents a phase position of the robot in the gait at the current moment, and is expressed as a percentage. In FIG. 5, the current gait phase is 40%, which means that a front left leg and a back right leg are in a support state, and after 10% of the cycle, these two legs become into a swinging state.

In the program, a counter with 1 added at each moment is set to correspond to the time of the robot. For example, the cycle of the original gait is T1, and the support leg and the swinging leg account for 50%, respectively. When disturbed, the value of the counter is count1, and the phase of the gait at this time is denoted as phase=(count_1% T_1)/T_1.

The symbol % represents an operation of taking a remainder. When switching to the gait whose cycle is T2, in which the support leg and the swinging leg account for 50%, respectively, in order to ensure that the gait phases are consistent as much as possible, it is necessary to modify the value of the current counter to be count2, which needs to satisfy (count_2% T_2)/T_2=(count_1% T_1)/T_1, so as to obtain count_2=(count_1% T_1)/T_1*T_2.

At step S305, it is determined that the disturbance is cancelled and the gait frequency is restored.

In some embodiments, after a certain time, if the first difference value and the second difference value are both smaller than the third preset speed threshold, it is determined that the disturbance state of the robot is the normal state. That is, the disturbance has been cancelled, and the gait frequency of the robot is restored from the target gait frequency to the gait frequency before adjustment.

Still following the above example, the conditions of judging whether the disturbance disappears or occurs also include four conditions, namely, the difference between the speed and the desired speed in the x direction, the difference between the speed and the desired speed in the y direction, the difference between the speed and the average speed in the x direction, and the difference between the speed and the average speed in the y direction, and additionally, further include a delay condition. After detecting the disturbance, the robot will record the current moment to. Only when the current moment t is larger than tO plus time delta t, judging whether the disturbance disappears can be started. This is intended to ensure that after the disturbance is triggered, the robot has enough time to eliminate the disturbance, so as to avoid the false restoration of the original gait frequency when the condition of the disturbance disappearing is satisfied at a certain moment during the initial stage with a large speed fluctuation of the disturbance. This false restoration often leads to a frequent switching of the gait frequency of the robot.

According to the anti-disturbance method for the robot mentioned in the above embodiments, the disturbance state of the robot is determined based on the current speed information and the desired speed of the robot, and also, the desired speed and the average speed are introduced as the judgment bases, so as to improve the detection efficiency of the disturbance state of the robot; the gait frequency of the robot is adjusted according to the disturbance state, and returns to the previous motion state after the disturbance stops, so that the robot can automatically change the gait frequency to resist the external disturbance on the basis of adjusting the landing point, and the robot has a better anti-disturbance performance when walking at a low frequency. Moreover, on the premise of a fast response speed, the requirements of energy consumption and noise are also taken into account. In addition, with this solution, the robot can also automatically switch from a standing state to walking, which improves the stability in the standing state.

Figure 6:
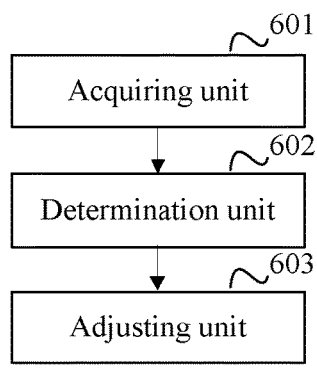
FIG. 6 is a schematic diagram of an anti-disturbance device for a robot according to an embodiment of the present disclosure.

As shown in FIG. 6, based on the same inventive concept of the anti-disturbance method for the robot, the present disclosure also provides an anti-disturbance device for robot, which includes: an acquiring unit 601 configured to acquire current speed information of the robot in a moving coordinate system; a determination unit 602 configured to determine a disturbance state of the robot based on the current speed information and a desired speed of the robot, in which the disturbance state includes a disturbed state and a normal state; and an adjusting unit 603 configured to adjust a gait frequency of the robot if the disturbance state is the disturbed state.

In an embodiment, the current speed information of the robot in the moving coordinate system includes a first current speed of the robot in a first direction of the moving coordinate system and a second current speed of the robot in a second direction of the moving coordinate system; the desired speed includes a first desired speed of the robot in the first direction of the moving coordinate system and a second desired speed of the robot in the second direction of the moving coordinate system, in which the speed of the robot is not zero. The determination unit 602 is used for: determining a first difference value between the first current speed and the first desired speed, and determining a second difference value between the second current speed and the second desired speed; determining that the disturbance state of the robot is the disturbed state, if the first difference value or the second difference value is greater than a first preset speed threshold; and determining that the disturbance state of the robot is the normal state, if the first difference value is not greater than the first preset speed threshold and the second difference value is not greater than the first preset speed threshold.

In an embodiment, the current speed information of the robot in the moving coordinate system further includes a first average speed of the robot in the first direction of the moving coordinate system and a second average speed of the robot in the second direction of the moving coordinate system. The determination unit 602 is used for: determining a third difference value between the first current speed and the first average speed, and determining a fourth difference value between the second current speed and the second average speed; and determining that the disturbance state of the robot is the disturbed state, if the first difference value or the second difference value is greater than the first preset speed threshold, and the third difference value or the fourth difference value is greater than a second preset speed threshold.

In an embodiment, the adjusting unit 603 is used for: determining the target gait frequency based on the first difference value and the second difference value, if the disturbance state is the disturbed state; and adjusting the gait frequency of the robot to be the target gait frequency.

In an embodiment, the adjusting unit 603 is further used for: determining that the disturbance state of the robot is the normal state, when the first difference value and the second difference value are both smaller than a third preset speed threshold; and restoring the gait frequency of the robot from the target gait frequency to the gait frequency before adjustment.

In an embodiment, if the speed of the robot is zero, the current speed information further includes position information; the determination unit 602 is used for determining the disturbance state of the robot based on the position information and the desired position information of the robot.

Figure 7:
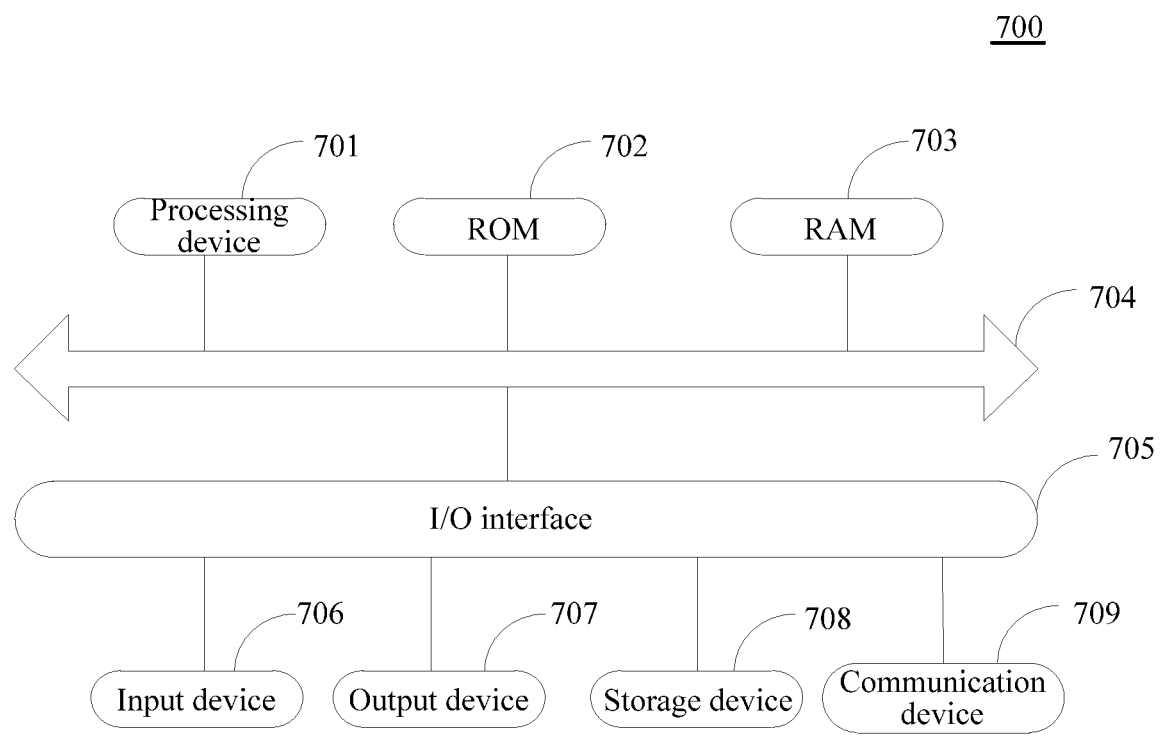
FIG. 7 is a schematic diagram of an electronic apparatus according to an embodiment of the present disclosure.

In addition, the anti-disturbance method and device for the robot according to the embodiments of the present disclosure described with reference to FIGS. 2-6 can be implemented by an electronic apparatus. FIG. 7 shows a schematic diagram of an electronic apparatus 700 suitable for implementing the embodiments of the present disclosure. The electronic apparatus shown in FIG. 7 is only an example, and should not bring any limitation to the functions and application scopes of the embodiments of the present disclosure.

As shown in FIG. 7, the electronic apparatus 700 may include a processing device (such as a central processer, a graphics processor, etc.) 701, which may perform various appropriate actions and processing to realize the anti-disturbance method for the robot according to the embodiments of the present disclosure according to a program stored in a read-only memory (ROM) 702 or a program loaded from a storage device 708 into a random access memory (RAM) 703. In the RAM 703, various programs and data required for the operation of the electronic apparatus 700 are also stored. The processing device 701, ROM 702, and RAM 703 are connected to each other through a bus 704. An input/output (I/O) interface 705 is also connected to the bus 704.

Generally, the following devices can be connected to the I/O interface 705: an input device 706 including, for example, a touch screen, a touch panel, a keyboard, a mouse, a camera, a microphone, an accelerometer, a gyroscope, and the like; an output device 707 including, for example, a liquid crystal display (LCD), a speaker, a vibrator, and the like; a storage device 708 including a magnetic tape, a hard disk, etc.; and a communication device 709. The communication device 709 may allow the electronic apparatus 700 to perform wireless or wired communication with other devices to exchange data. Although FIG. 7 shows the electronic apparatus 700 with various devices, it should be understood that it is not necessary to implement or have all the devices shown. More or fewer devices may be implemented or provided instead.

Particularly, according to the embodiments of the present disclosure, the process described above with reference to the flow chart can be implemented as a computer software program. For example, an embodiment of the present disclosure includes a computer program product, which includes a computer program carried on a non-transitory computer readable medium, and the computer program contains program codes for executing the method shown in the flow chart, thereby realizing the anti-disturbance method for the robot as described above. In such an embodiment, the computer program can be downloaded and installed from the network through the communication device 709, or installed from the storage device 708 or the ROM 702. When the computer program is executed by the processing device 701, the above functions defined in the method of the embodiments of the present disclosure are performed.

The embodiments of the present disclosure further provide a robot, which includes the anti-disturbance device for the robot or the electronic apparatus described in the above embodiments.

It should be noted that the above computer-readable medium of the present disclosure may be a computer-readable signal medium or a computer-readable storage medium or any combination of the above two. The computer-readable storage medium may be, for example, but not limited to, an electronic, magnetic, optical, electromagnetic, infrared, or semiconductor system, apparatus or device, or a combination of any of the above. More specific examples of the computer-readable storage medium may include, but are not limited to, an electrical connection with one or more wires, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program that can be used by or in connection with an instruction execution system, apparatus or device. In the present disclosure, however, the computer-readable signal medium may include data signals propagated in a base band or as part of a carrier wave, in which computer-readable program codes are carried. This propagated data signal may take various forms, including but not limited to an electromagnetic signal, an optical signal or any suitable combination of the above. The computer-readable signal medium may also be any computer-readable medium other than the computer-readable storage medium, and the computer-readable signal medium can send, propagate or transport a program to be used by or in connection with the instruction execution system, apparatus or device. The program code contained on the computer readable medium can be transmitted by any suitable medium, including but not limited to an electric wire, an optical cable, RF (radio frequency), etc., or any suitable combination of the above.

In some embodiments, the client and the server can communicate by using any network protocol currently known or to be developed in the future, such as HTTP (Hyper Text Transfer Protocol), and can be interconnected with digital data communication (e.g., a communication network) of any form or medium. Examples of the communication network include a local area network ("LAN"), a wide area network ("WAN"), an internet (e.g., the Internet) and an end-to-end network (e.g., the ad hoc end-to-end network), as well as any network currently known or to be developed in the future.

The computer readable medium may be included in the above electronic apparatus, or may exist separately without being assembled into the electronic apparatus.

The computer readable medium carries one or more programs which, when executed by the electronic apparatus, allow the electronic apparatus to: acquire current speed information of the robot in a moving coordinate system; determine a disturbance state of the robot based on the current speed information and a desired speed of the robot, in which the disturbance state includes a disturbed state and a normal state; and adjusting a gait frequency of the robot, if the disturbance state is the disturbed state.

In some embodiments, when the above one or more programs are executed by the electronic apparatus, the electronic apparatus may also perform other steps described in the above embodiments.

Computer program codes for performing the operations of the present disclosure can be written in one or more programming languages or their combinations, the above programming languages include, but are not limited to object-oriented programming languages such as Java, Smalltalk, C++, and conventional procedural programming languages such as "C" language or similar programming languages. The program codes can be executed completely on a user computer, partially on the user computer, as an independent software package, partially on the user computer and partially on a remote computer, or completely on a remote computer or server. In the case of the remote computer, the remote computer can be connected to the user computer through any kind of network, including the local area network (LAN) or the wide area network (WAN), or it can be connected to an external computer (for example, being connected through the Internet by using an Internet service provider).

The flow chart and block diagram in the drawings illustrate the possible architectures, functions and operations of the system, method and computer program product according to various embodiments of the present disclosure. In this regard, each block in the flow chart or block diagram may represent a module, a program segment, or part of a code, which contains one or more executable instructions for implementing the specified logical functions. It should also be noted that in some alternative implementations, the functions marked in the blocks may also occur in a different order than those marked in the drawings. For example, two successive blocks can actually be executed basically in parallel, and sometimes they can be executed in a reverse order, depending on the functions involved. It should also be noted that each block in the block diagram and/or flow chart, and the combination of the blocks in the block diagram and/or flow chart, can be implemented by a dedicated hardware-based system that performs specified functions or operations, or can be implemented by a combination of dedicated hardware and computer instructions.

The units involved in the embodiments of the present disclosure can be implemented by software or hardware. In some cases, the name of the unit does not constitute a limitation to the unit itself.

The functions described above in the present disclosure can be at least partially performed by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System-on-Chip (SOC), Complex Programmable Logic Device (CPLD), etc.

In the context of the present disclosure, a machine-readable medium can be a tangible medium that can contain or store a program to be used by or in connection with an instruction execution system, apparatus or device. The machine-readable medium may be a machine-readable signal medium or a machine-readable storage medium. The machine-readable medium can include, but is not limited to, electronic, magnetic, optical, electromagnetic, infrared, or semiconductor systems, devices or apparatuses, or any suitable combination of the above. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any suitable combination of the above.

In the embodiments of the present disclosure, the current speed information of the robot in the moving coordinate system is acquired, then the disturbance state of the robot is determined based on the current speed information and the desired speed of the robot, and if the disturbance state is the disturbed state, the gait frequency of the robot is adjusted. Compared with the related art, the present disclosure solves the problem that the disturbance can only be resisted by adjusting the landing point and the trunk posture, which cannot meet the requirement of anti-disturbance. The present disclosure allows the robot to automatically change the gait frequency to resist the external disturbance, so that the robot has the great disturbance resistance while walking at the low frequency.

It should be understood by those skilled in the art that the embodiments of the present disclosure can be provided as methods, systems, or computer program products. Therefore, the present disclosure can take a form of an entire hardware embodiment, an entire software embodiment, or an embodiment combining software and hardware aspects. Furthermore, the present disclosure may take a form of a computer program product implemented on one or more computer usable storage media (including but not limited to a disk memory, a CD-ROM, an optical storage, etc.) in which computer usable program codes are contained.

The present disclosure is described with reference to flow charts and/or block diagrams of methods, devices (systems), and computer program products according to the embodiments of the present disclosure. It should be understood that each flow and/or block in the flow chart and/or block diagram, and combinations of flows and/or blocks in the flow chart and/or block diagram can be realized by computer program instructions. These computer program instructions may be provided to the processors of a general-purpose computer, a special-purpose computer, an embedded handler or other programmable data processing apparatuses to produce a machine, so that a device for implementing the functions specified in one or more flows in the flow chart and/or one or more blocks in the block diagram is produced through the instructions executed by the processors of the computer or other programmable data processing apparatuses.

These computer program instructions can also be stored in a computer-readable memory that can direct a computer or other programmable data processing apparatuses to work in a specific way, so that the instructions stored in the computer-readable memory produce a product including an instruction device that implements the functions specified in one or more flows in the flow chart and/or one or more blocks in the block diagram.

These computer program instructions can also be loaded on a computer or other programmable data processing apparatuses, so that a series of operation steps are executed on the computer or other programmable apparatuses to produce a computer-implemented processing, so that the instructions executed on the computer or other programmable apparatuses provide steps for realizing the functions specified in one or more flows in the flow chart and/or one or more blocks in the block diagram.

Although the embodiments of the present disclosure have been described, those skilled in the art can make additional changes and modifications to these embodiments once they know the basic inventive concept. Therefore, the appended claims are intended to be interpreted as including the embodiments and all changes and modifications that fall within the scope of the present disclosure.

Apparently, those skilled in the art can make various changes and modifications to the present disclosure without departing from the spirit and scope of the present disclosure. Thus, if these modifications and variations of the present disclosure fall within the scope of the claims of the present disclosure and their technical equivalents, the present disclosure is also intended to include these modifications and variations.

What is claimed is:

1. An anti-disturbance method for a robot, comprising:
acquiring current speed information of the robot in a moving coordinate system;
determining a disturbance state of the robot based on the current speed information and a desired speed of the robot, wherein the disturbance state comprises a disturbed state and a normal state; and
adjusting a gait frequency of the robot, in response to determining that the disturbance state is the disturbed state,
wherein the current speed information comprises a first current speed of the robot in a first direction of the moving coordinate system and a second current speed of the robot in a second direction of the moving coordinate system; the desired speed comprises a first desired speed of the robot in the first direction of the moving coordinate system and a second desired speed of the robot in the second direction of the moving coordinate system, wherein a speed of the robot is not zero;
wherein determining a disturbance state of the robot based on the current speed information and a desired speed of the robot comprises:
determining a first difference value between the first current speed and the first desired speed, and determining a second difference value between the second current speed and the second desired speed; and
determining that the disturbance state of the robot is the disturbed state, in response to determining that at least one of the first difference value or the second difference value is greater than a first preset speed threshold,
wherein the current speed information of the robot in the moving coordinate system further comprises a first average speed of the robot in the first direction of the moving coordinate system and a second average speed of the robot in the second direction of the moving coordinate system;
determining that the disturbance state of the robot is the disturbed state, in response to determining that at least one of the first difference value or the second difference value is greater than a first preset speed threshold, comprises:
determining a third difference value between the first current speed and the first average speed, and determining a fourth difference value between the second current speed and the second average speed; and
determining that the disturbance state of the robot is the disturbed state, in response to determining that at least one of the first difference value or the second difference value is greater than the first preset speed threshold, and at least one of the third difference value or the fourth difference value is greater than a second preset speed threshold.

2. The anti-disturbance method for the robot according to claim 1,
wherein determining a disturbance state of the robot based on the current speed information and a desired speed of the robot further comprises:
determining that the disturbance state of the robot is the normal state, in response to determining that the first difference value is not greater than the first preset speed threshold and the second difference value is not greater than the first preset speed threshold.

3. The anti-disturbance method for the robot according to claim 1, wherein adjusting a gait frequency of the robot, in response to determining that the disturbance state is the disturbed state, comprises:
determining a target gait frequency based on the first difference value and the second difference value, in response to determining that the disturbance state is the disturbed state; and
adjusting the gait frequency of the robot to be the target gait frequency.

4. The anti-disturbance method for the robot according to claim 3, wherein after adjusting a gait frequency of the robot, in response to determining that the disturbance state is the disturbed state, the method further comprises:

determining that the disturbance state of the robot is the normal state, in response to determining that the first difference value and the second difference value are both smaller than a third preset speed threshold; and restoring the gait frequency of the robot from the target gait frequency to the gait frequency before adjustment.

5. The anti-disturbance method for the robot according to claim 1, wherein adjusting a gait frequency of the robot, in response to determining that the disturbance state is the disturbed state, comprises:

determining a target gait frequency based on the first difference value and the second difference value, in response to determining that the disturbance state is the disturbed state; and adjusting the gait frequency of the robot to be the target gait frequency.

6. The anti-disturbance method for the robot according to claim 5, wherein after adjusting a gait frequency of the robot, in response to determining that the disturbance state is the disturbed state, the method further comprises:

determining that the disturbance state of the robot is the normal state, in response to determining that the first difference value and the second difference value are both smaller than a third preset speed threshold; and restoring the gait frequency of the robot from the target gait frequency to the gait frequency before adjustment.

7. The anti-disturbance method for the robot according to claim 1, wherein a speed of the robot is zero, and the current speed information further comprises position information;

wherein determining a disturbance state of the robot based on the current speed information and a desired speed of the robot, comprises:

determining the disturbance state of the robot based on the position information and desired position information of the robot.

8. An anti-disturbance device for a robot, comprising a processor configured to:

acquire current speed information of the robot in a moving coordinate system;

determine a disturbance state of the robot based on the current speed information and a desired speed of the robot, wherein the disturbance state comprises a disturbed state and a normal state; and adjust a gait frequency of the robot, in response to determining that the disturbance state is the disturbed state, wherein the current speed information of the robot in the moving coordinate system comprises a first current speed of the robot in a first direction of the moving coordinate system and a second current speed of the robot in a second direction of the moving coordinate system; the desired speed includes a first desired speed of the robot in the first direction of the moving coordinate system and a second desired speed of the robot in the second direction of the moving coordinate system, wherein a speed of the robot is not zero;

wherein the processor is configured to:

determine a first difference value between the first current speed and the first desired speed, and determine a second difference value between the second current speed and the second desired speed; and determine that the disturbance state of the robot is the disturbed state, in response to determining that at least one of the first difference value or the second difference value is greater than a first preset speed threshold, wherein the current speed information of the robot in the moving coordinate system further comprises a first average speed of the robot in the first direction of the moving coordinate system and a second average speed of the robot in the second direction of the moving coordinate system;

wherein the processor is configured to:

determine a third difference value between the first current speed and the first average speed, and determine a fourth difference value between the second current speed and the second average speed; and determine that the disturbance state of the robot is the disturbed state, in response to determining that at least one of the first difference value or the second difference value is greater than the first preset speed threshold, and at least one of the third difference value or the fourth difference value is greater than a second preset speed threshold.

9. The anti-disturbance device for the robot according to claim 8, wherein the processor is further configured to:

determine that the disturbance state of the robot is the normal state, in response to determining that the first difference value is not greater than the first preset speed threshold and the second difference value is not greater than the first preset speed threshold.

10. The anti-disturbance device for the robot according to claim 8, wherein the processor is configured to:

determine a target gait frequency based on the first difference value and the second difference value, in response to determining that the disturbance state is the disturbed state; and adjust the gait frequency of the robot to be the target gait frequency.

11. The anti-disturbance device for the robot according to claim 8, wherein the processor is configured to:

determine a target gait frequency based on the first difference value and the second difference value, in response to determining that the disturbance state is the disturbed state; and adjust the gait frequency of the robot to be the target gait frequency.

12. The anti-disturbance device for the robot according to claim 11, wherein the processor is further configured to:

determine that the disturbance state of the robot is the normal state, in response to determining that the first difference value and the second difference value are both smaller than a third preset speed threshold; and restore the gait frequency of the robot from the target gait frequency to the gait frequency before adjustment.

13. The anti-disturbance device for the robot according to claim 8, wherein a speed of the robot is zero, and the current speed information further comprises position information;

wherein the processor is configured to:

determine the disturbance state of the robot based on the position information and desired position information of the robot.

14. A robot, comprising an anti-disturbance device, wherein the anti-disturbance device comprises a processor configured to:

acquire current speed information of the robot in a moving coordinate system;

determine a disturbance state of the robot based on the current speed information and a desired speed of the robot, wherein the disturbance state comprises a disturbed state and a normal state; and adjust a gait frequency of the robot, in response to determining that the disturbance state is the disturbed state, wherein the current speed information comprises a first current speed of the robot in a first direction of the moving coordinate system and a second current speed of the robot in a second direction of the moving coordinate system; the desired speed comprises a first desired speed of the robot in the first direction of the moving coordinate system and a second desired speed of the robot in the second direction of the moving coordinate system, wherein a speed of the robot is not zero;

wherein the processor is configured to:

determine a first difference value between the first current speed and the first desired speed, and determine a second difference value between the second current speed and the second desired speed; and determine that the disturbance state of the robot is the disturbed state, in response to determining that at least one of the first difference value or the second difference value is greater than a first preset speed threshold, wherein the current speed information of the robot in the moving coordinate system further comprises a first average speed of the robot in the first direction of the moving coordinate system and a second average speed of the robot in the second direction of the moving coordinate system;

wherein the processor is configured to:

determine a third difference value between the first current speed and the first average speed, and determine a fourth difference value between the second current speed and the second average speed; and determine that the disturbance state of the robot is the disturbed state, in response to determining that at least one of the first difference value or the second difference value is greater than the first preset speed threshold, and at least one of the third difference value or the fourth difference value is greater than a second preset speed threshold.

15. The robot according to claim 14, wherein the processor is further configured to:

determine that the disturbance state of the robot is the normal state, in response to determining that the first difference value is not greater than the first preset speed threshold and the second difference value is not greater than the first preset speed threshold.

16. The robot according to claim 14, wherein the processor is configured to:

determine a target gait frequency based on the first difference value and the second difference value, in response to determining that the disturbance state is the disturbed state; and adjust the gait frequency of the robot to be the target gait frequency.

17. The robot according to claim 16, wherein the processor is further configured to:

determine that the disturbance state of the robot is the normal state, in response to determining that the first difference value and the second difference value are both smaller than a third preset speed threshold; and restore the gait frequency of the robot from the target gait frequency to the gait frequency before adjustment.

* * * * *